Figure 2:
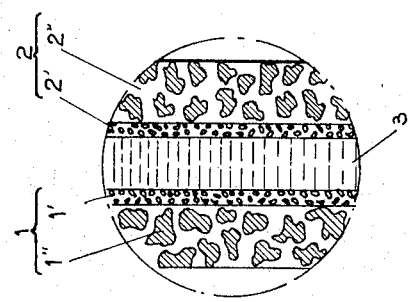

Jan. 24, 1967 H. HUBER ETAL 3,300,343
FUEL CELL INCLUDING ELECTRODES HAVING
TWO DISSIMILAR SURFACES
Filed Jan. 16, 1962

INVENTORS:
H·HUBER et R. LE BIHAN

BY Paul M. Craig, Jr.
ATTORNEY

United States Patent Office 3,300,343
Patented Jan. 24, 1967

3,300,343
FUEL CELL INCLUDING ELECTRODES HAVING TWO DISSIMILAR SURFACES
Harry Huber and Raymond Le Bihan, Paris, France, assignors to CSF—Compagnie Generale de Telegraphie Sans Fil, Paris, France
Filed Jan. 16, 1962, Ser. No. 166,654
Claims priority, application France, Jan. 31, 1961, 851,202
3 Claims. (Cl. 136—86)

The present invention relates to electrochemical cells generally known under the name of fuel cells, and relates more particularly to the electrodes for such cells.

It is known that fuel batteries are formed of cells each comprising a positive electrode and a negative electrode separated by an ion conductor, for example, an electrolyte in solution, these elements being constituted by appropriate materials to permit transformation of the chemical energy directly into electrical energy by the oxidation of the positive electrode and the reduction of the negative electrode.

To that effect, the negative electrode is constituted by a combustible material, for example, carbon or a material fed with a combustible gas, for example, hydrogen, whereas the positive electrode is constituted by an oxidizing material, for example, metal oxides or a material fed with a combustive gas, for example, oxygen or air, wherein the electrodes supplied with gas may be constructed either porous or solid.

Within the fuel cells in which porous electrodes have the two faces thereof respectively in contact with a liquid electrolyte and a gas chamber, there is established a difference in pressure between the two faces in order that the liquid electrolyte only penetrates through a small fraction of the total thickness of the electrodes. There is thus obtained on the electrodes a thin layer wetted or moistened by the electrolyte and a thicker layer in contact with the gas which remains dry. Additionally, porous electrodes have already been realized which have smaller pores within the wetted layer than within the dry layer.

However, in all these prior art constructions, the two layers of these known electrodes were made of the same material which had to be chosen among those materials not subject to attack by the electrolyte.

The present invention has as its primary object an improvement for porous electrodes which consists in making each electrode of two different materials, one for the moistened layer and the other for the dry layer, the first being chosen from among the materials that are resistant to attack by the electrolyte, and the other from among the materials that act as catalyst to facilitate the reacion, namely either oxidation or a reduction, of the electrode under consideration.

Accordingly, it is an object of the present invention to provide a fuel cell of the type described hereinabove which improves the performance characteristics while at the same time eliminating the inconveniences and shortcomings encountered with the prior art structures.

It is another object of the present invention to provide an electrode structure for fuel cells of the type mentioned hereinabove which permits an increase in the output of the cells and also assures an improvement in the electrode activity.

A further object of the present invention resides in the provision of fuel cells with electrode structures enabling an increase in the power of the cell by the use of appropriate catalytic agents while at the same time increasing considerably the length of life of the electrodes.

Still a further object of the present invention resides in the provision of a fuel cell having an electrode structure achieving the aforementioned objects in a simple manner by relatively inexpensive means as a result of the multi-layer electrode structure constituted of different materials.

Figure 1:
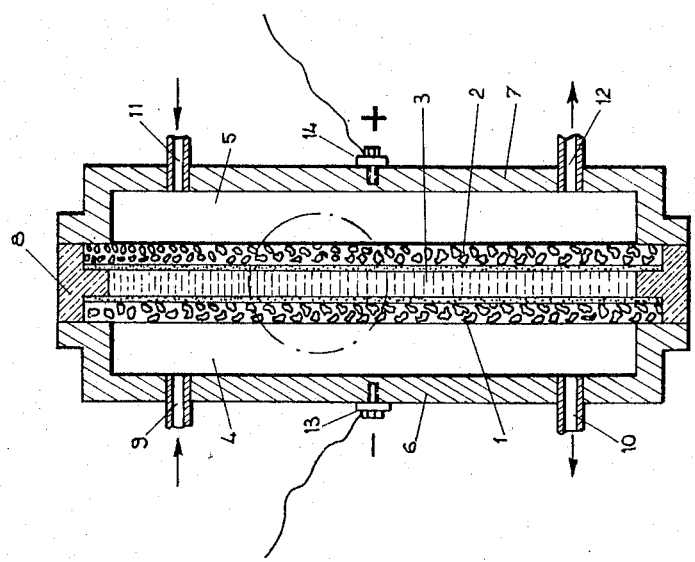

These and other objects, features and advantages of the present invention will become more obvious from the following description when taken in connection with the accompanying drawing which shows, for purposes of illustration only, one embodiment in accordance with the present invention, and wherein FIGURE 1 is a schematic cross-sectional view through a fuel cell that utilizes porous electrodes in accordance with the present invention, and FIGURE 2 is a partial cross-sectional view, on an enlarged scale, of the structure of these electrodes shown in FIGURE 1.

Referring now to the drawing wherein like reference numerals are used throughout the two views to designate corresponding parts, and more particularly to FIGURE 1 which shows schematically and in cross-section a fuel cell, it may be readily seen from this figure that the cell comprises two porous electrodes 1 and 2, separated by an electrolyte in solution 3 and contiguous to gas chambers 4 and 5, the latter being respectively a chamber with a combustible medium and a chamber with a combustive or oxidizing medium.

The cell is enclosed within a tight casing or envelope, composed of two metallic side portions 6 and 7, in contact respectively with the electrodes 1 and 2, and separated from each other by an insulating portion 8.

The gas chambers 4 and 5 are provided with input and output nipples 9 and 10 for the first chamber 4 and with input and output nipples 11 and 12 for the second chamber 5. Similarly, nipples (not shown) are provided for the supply and discharge of the electrolyte.

Conductive terminals 13 and 14 secured to the side portions 6 and 7 in any suitable manner, for example, screwed or soldered thereto, constitute the two poles of the cell, namely the negative and positive terminals.

The arrangements of FIGURE 1 described so far are known in principle and it is necessary merely to recall that the cell operates in the following manner:

During the time during which a difference of pressure is maintained within the cell between the two faces of the electrodes in order to prevent the penetration of the electrolyte into the electrodes beyond a predetermined small thickness, the two porous electrodes impregnated, respectively, with oxidizing and combustible gas and wetted or moistened by the electrolyte, are respectively the place of reactions of oxidation and reduction, whereas the electrolyte recombines the positive and negative ions formed during these reactions at the two electrodes.

A difference of potential, of the order of a volt, is established at the terminals of the cell and enables the conduction of a current within a load such as a resistance (not shown) connected between these terminals. The chemical energy, furnished to the cell, is thus transformed directly into electrical energy.

To improve the activity of the electrodes and to increase the output of the cells, there are used, according to the present invention, porous electrodes made of two different materials.

FIGURE 2, which is an enlargement of the portion encircled in FIGURE 1, shows that the two electrodes 1 and 2 are composed respectively of layers 1' and 1" and layers 2' and 2".

The layers 1' and 2', in contact with the electrolyte 3, representing the moistened or wetted layers, have preferably pores which are smaller than the layers 1" and 2" in contact with the gas and forming the dry layers.

According to the present invention, these two layers of each electrode are made of different materials, the choice of these materials being guided by the principle that the wetted or moistened layer must be resistant to attack by the electrolyte and that a material is used for the dry layer which acts a catalyst for the reactions produced on the electrode under consideration.

Thus, for example, in the case of a hydrogen electrode, the dry layer may be made of nickel or platinum and the wet layer of silver, whereas within an oxygen electrode, the dry layer may be made of copper and the wet layer of silver.

It is obvious that electrodes made each of two suitably chosen materials increase the power of the cell by reason of the fact that recourse is had to catalytic agents and that, on the other hand, the duration of the life of the electrodes is considerably increased owing to the possibility of utilizing materials that are not attacked by or are resistant to the electrolyte.

While we have shown and described one embodiment in accordance with the present invention, it is understood that the same is not limited thereto, but is susceptible of many changes and modifications within the spirit and scope thereof and we therefore do not wish to be limited to the details shown and described herein, but intend to cover all such changes and modifications as are encompassed by the scope of the appended claims.

We claim:

1. A fuel cell comprising a pair of porous electrodes, a liquid electrolyte confined between said electrodes and in contact with one side of each of said electrodes, means for supplying gaseous fuel to the other side of one electrode and for supplying oxidizing gas to the other side of the other electrode, each electrode having two dissimilar surfaces, the surface of said electrode which is disposed adjacent to the liquid electrolyte being made of a material that is resistant to attack by said electrolyte liquid and the other surface of said electrode being made of a material which acts as catalyst for the chemical reaction that takes place on that electrode, one of said electrodes being a hydrogen electrode in which the surface adjacent to the electrolyte consists of silver while the other surface thereof is a material selected from the group consisting of nickel and platinum.

2. A fuel cell comprising a pair of porous electrodes, a liquid electrolyte confined between said electrodes and in contact with one side of each of said electrodes, means for supplying gaseous fuel to the other side of one electrode and for supplying oxidizing gas to the other side of the other electrode, each electrode having two dissimilar surfaces, the surface of said electrode which is disposed adjacent to the liquid electrolyte being made of a material that is resistant to attack by said electrolyte liquid and the other surface of said electrode being made of a material which acts as catalyst for the chemical reaction that takes place on that electrode, one of said electrodes being a hydrogen electrode in which the surface adjacent to the electrolyte consists of silver while the other surface thereof is a material selected from the group consisting of nickel and platinum and the other electrode being an oxygen electrode in which the surface thereof adjacent to the electrolyte consists of silver and the other surface thereof consists of copper.

3. A fuel cell comprising a pair of porous electrodes, a liquid electrolyte confined between said electrodes and in contact with a respective side of each of said electrodes, means for supplying gaseous fuel to the other side of one electrode and means for supplying oxidizing gas to the other side of the other electrode, each electrode having two dissimilar surfaces, the surface of said electrode which is disposed adjacent to the liquid electrolyte being made of a material that is resistant to attack by said electrolyte liquid and the other surface of said electrode being made of a material which acts as catalyst for the chemical reaction that takes place on that electrode, one of said electrodes being an oxygen electrode in which the surface thereof adjacent to the electrolyte consists of silver and the other surface thereof consists of copper.

References Cited by the Examiner

UNITED STATES PATENTS

| 2,914,596 | 11/1959 | Gorin et al. | 136—86 |
| 2,947,797 | 8/1960 | Justi et al. | 136—120 |
| 3,040,115 | 6/1962 | Moos | 136—86 X |
| 3,068,311 | 12/1962 | Chamber et al. | 136—86 |

WINSTON A. DOUGLAS, *Primary Examiner.*

JOHN R. SPECK, *Examiner.*

H. FEELEY, A. B. CURTIS, *Assistant Examiners.*